(12) United States Patent  
Miura

(10) Patent No.: US 11,960,646 B2  
(45) Date of Patent: Apr. 16, 2024

(54) DISPLAY CONTROL DEVICE, DISPLAY SYSTEM, DISPLAY METHOD, AND DISPLAY PROGRAM

(71) Applicant: TOYOTA JIDOSHA KABUSHIKI KAISHA, Aichi-ken (JP)

(72) Inventor: Yasuhiro Miura, Owariasahi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/888,483

(22) Filed: Aug. 16, 2022

(65) Prior Publication Data

US 2023/0066068 A1 Mar. 2, 2023

(30) Foreign Application Priority Data

Aug. 27, 2021 (JP) .................................. 2021-139246

(51) Int. Cl.
| | |
|---|---|
| *G06F 3/01* | (2006.01) |
| *G02B 27/01* | (2006.01) |
| *G02C 7/04* | (2006.01) |
| *G06F 3/14* | (2006.01) |

(52) U.S. Cl.
CPC ......... *G06F 3/013* (2013.01); *G02B 27/0172* (2013.01); *G02B 27/0179* (2013.01); *G02C 7/04* (2013.01); *G06F 3/14* (2013.01); *G02B 2027/014* (2013.01); *G02B 2027/0141* (2013.01); *G02B 2027/0187* (2013.01)

(58) Field of Classification Search
CPC . G06F 3/013; G06F 3/14; G06F 3/147; G02B 27/0172; G02B 27/0179; G02B 27/0093; G02B 2027/014; G02B 2027/0141; G02B 2027/0187; G02C 7/04; G02C 11/10; B60K 35/00; B60K 2370/177; B60K 2370/149; G09G 2380/10

See application file for complete search history.

(56) References Cited

U.S. PATENT DOCUMENTS

| | | | |
|---|---|---|---|
| 2020/0159366 A1* | 5/2020 | Matsuda | G06F 3/0488 |
| 2021/0049925 A1* | 2/2021 | Robinson | G06T 19/006 |
| 2022/0015622 A1* | 1/2022 | Singh | A61B 3/0025 |

FOREIGN PATENT DOCUMENTS

| | | | |
|---|---|---|---|
| JP | 202139554 A | | 3/2021 |
| JP | 2021039554 A | * | 3/2021 |

* cited by examiner

*Primary Examiner* — Brent D Castiaux  
(74) *Attorney, Agent, or Firm* — HAUPTMAN HAM, LLP

(57) ABSTRACT

A display control device includes a processor. The processor identifies an attraction target that guides a line of sight of an occupant, acquires the line of sight of the occupant, and causes a display unit attached to an eyeball of the occupant to display a guidance display that guides the line of sight of the occupant to the attraction target based on positional relationship between the line of sight of the occupant and the attraction target.

6 Claims, 7 Drawing Sheets

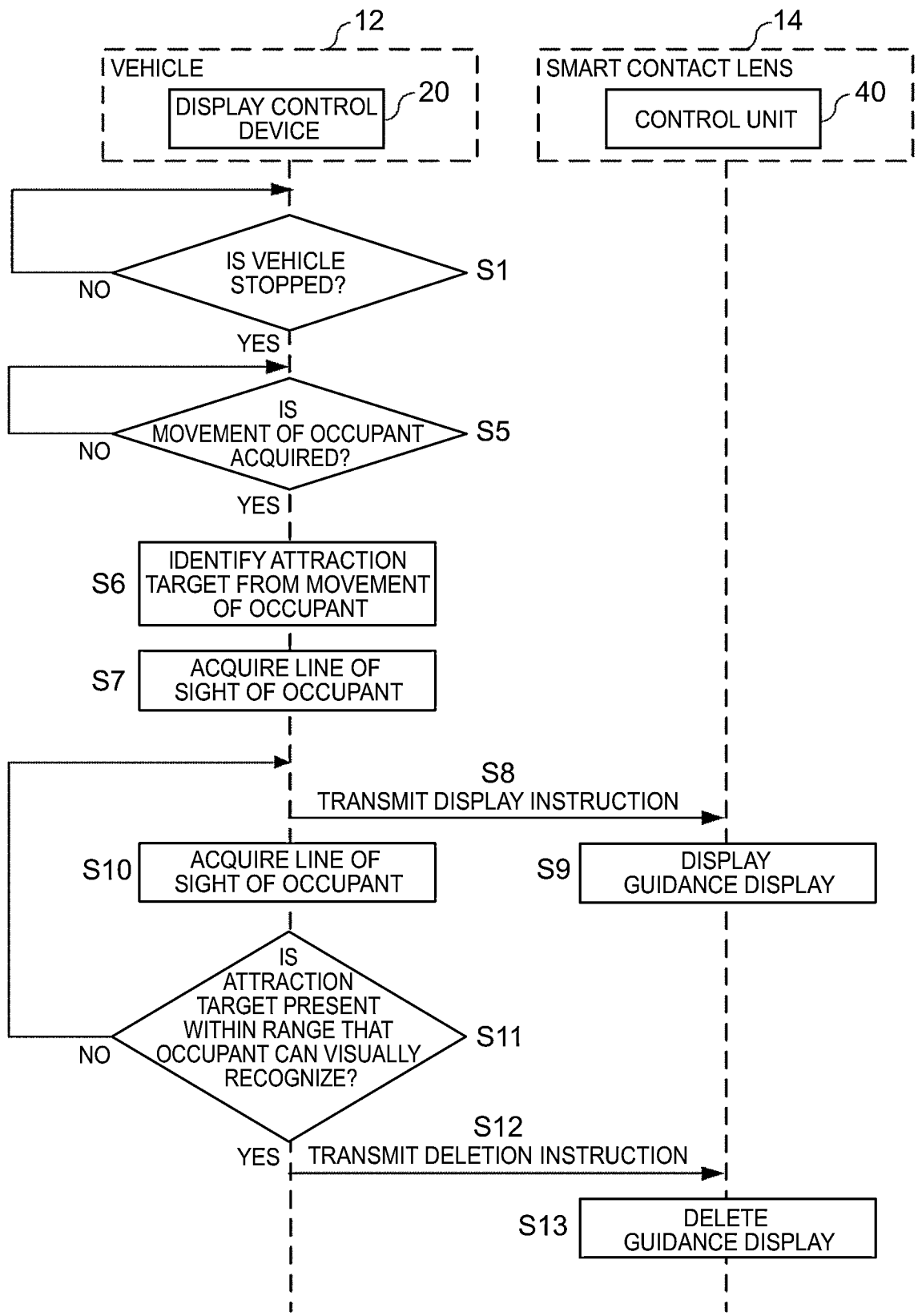

DISPLAY CONTROL DEVICE, DISPLAY SYSTEM, DISPLAY METHOD, AND DISPLAY PROGRAM

CROSS-REFERENCE TO RELATED APPLICATION

This application claims priority to Japanese Patent Application No. 2021-139246 filed on Aug. 27, 2021, incorporated herein by reference in its entirety.

BACKGROUND

1. Technical Field

The present disclosure relates to a display control device, a display system, a display method, and a display program.

2. Description of Related Art

Japanese Unexamined Patent Application Publication No. 2021-039554 (JP 2021-039554 A) discloses a vehicle gaze guidance device that guides the line of sight of a driver who drives a vehicle using illuminations provided in a vehicle cabin. The vehicle gaze guidance device identifies the line of sight of the driver and recognizes a potential target from the surrounding conditions of the vehicle. In addition, when the specified line of sight of the driver is in a direction different from the recognized target, this vehicle gaze guidance device starts to turn on, among the illuminations, the illumination at a position that the driver can recognize based on the specified line of sight of the driver. At the same time, the gaze guidance that moves the lighting to the target side is turned on.

SUMMARY

The vehicle gaze guidance device of JP 2021-039554 A cannot guide the line of sight of the occupant to the target without using illuminations. Therefore, there is an issue that, when a target is present in a direction in which any illumination is not provided, the line of sight of the occupant cannot be guided to the target.

The present disclosure has been made in consideration of the above fact, and it is an object of the present disclosure to provide a display control device, a display system, a display method, and a display program capable of guiding the line of sight of the user to an attraction target without requiring a physical mechanism such as illumination.

A display control device according to one or more claims includes a processor. The processor is configured to identify an attraction target that guides a line of sight of a user, acquire the line of sight of the user, and cause a display unit attached to an eyeball of the user to display a guidance display that guides the line of sight of the user to the attraction target based on positional relationship between the line of sight of the user and the attraction target.

In the display control device according to one or more claims, an identification unit identifies the attraction target that guides the line of sight of the user, an acquisition unit acquires the line of sight of the user, and a control unit executes control to cause the display unit attached to the eyeball of the user to display the guidance display that guides the line of sight of the user to the attraction target based on the positional relationship between the line of sight of the user and the attraction target. With the display control device according to one or more claims, the line of sight of the user can be guided to the attraction target without the need for a physical mechanism such as illumination.

In the display control device according to one or more claims, the processor identifies the attraction target based on an intention of an utterance of the user.

In the display control device according to one or more claims, the attraction target is identified based on the intention of the utterance, whereby the line of sight of the user can be guided to the attraction target without the need for a separate operation.

In the display control device according to one or more claims, the processor identifies the attraction target based on movement of the user.

In the display control device according to one or more claims, the attraction target is identified based on the movement of the user, whereby the line of sight of the user can be guided to the attraction target without the need for a separate operation.

In the display control device according to one or more claims, the processor causes the display unit to display the guidance display in the same direction as a direction of the attraction target with respect to the line of sight of the user.

In the display control device according to one or more claims, the user can find the attraction target earlier than the case where the guidance display is displayed in a direction different from the direction of the attraction target with respect to the line of sight of the user.

A display system according to one or more claims is a display system including the display control device according to one or more claims. The lens device includes a communication unit that communicates with the display unit and the display control device.

With the display system according to one or more claims, the line of sight of the user can be guided to the attraction target without the need for a physical mechanism such as illumination.

In a display method according to one or more claims, a computer executes processing including: identifying an attraction target that guides a line of sight of a user; acquiring the line of sight of the user; and causing a display unit attached to an eyeball of the user to display a guidance display that guides the line of sight of the user to the attraction target based on positional relationship between the line of sight of the user and the attraction target.

With the display method according to one or more claims, the line of sight of the user can be guided to the attraction target without the need for a physical mechanism such as illumination.

A display program according to one or more claims causes a computer to execute processing including: identifying an attraction target that guides a line of sight of a user; acquiring the line of sight of the user; and causing a display unit attached to an eyeball of the user to display a guidance display that guides the line of sight of the user to the attraction target based on positional relationship between the line of sight of the user and the attraction target.

With the display program according to one or more claims, the line of sight of the user can be guided to the attraction target without the need for a physical mechanism such as illumination.

According to the present disclosure, the line of sight of the user can be guided to the attraction target without the need for a physical mechanism such as illumination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is a sequence diagram showing a flow of processing in a display system according to a second embodiment.

DETAILED DESCRIPTION OF EMBODIMENTS

Hereinafter, a display system 10 according to embodiments of the present disclosure will be described with reference to the drawings.

Overall Configuration

Figure 1:
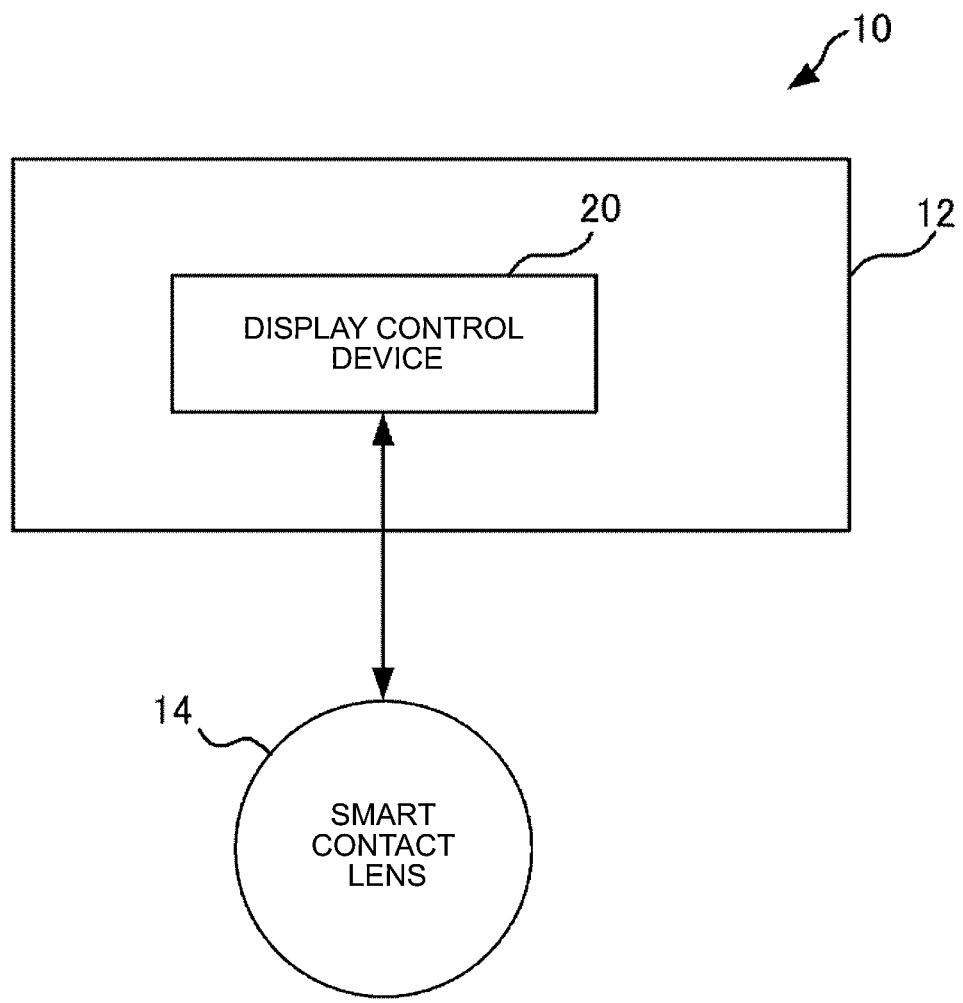
FIG. 1 is a diagram showing a schematic configuration of a display system according to an embodiment.

As shown in FIG. 1, the display system 10 according to the present embodiment includes a display control device 20 and a smart contact lens 14. The smart contact lens 14 is an example of a lens device.

The display control device 20 is mounted on a vehicle 12. The smart contact lens 14 is attached to an occupant P of the vehicle 12 who is a user of the display control device 20. Specifically, the smart contact lens 14 is attached to the eyeball of the occupant P. Note that, the smart contact lens 14 is communicably connected to the display control device 20.

Vehicle

Figure 2:
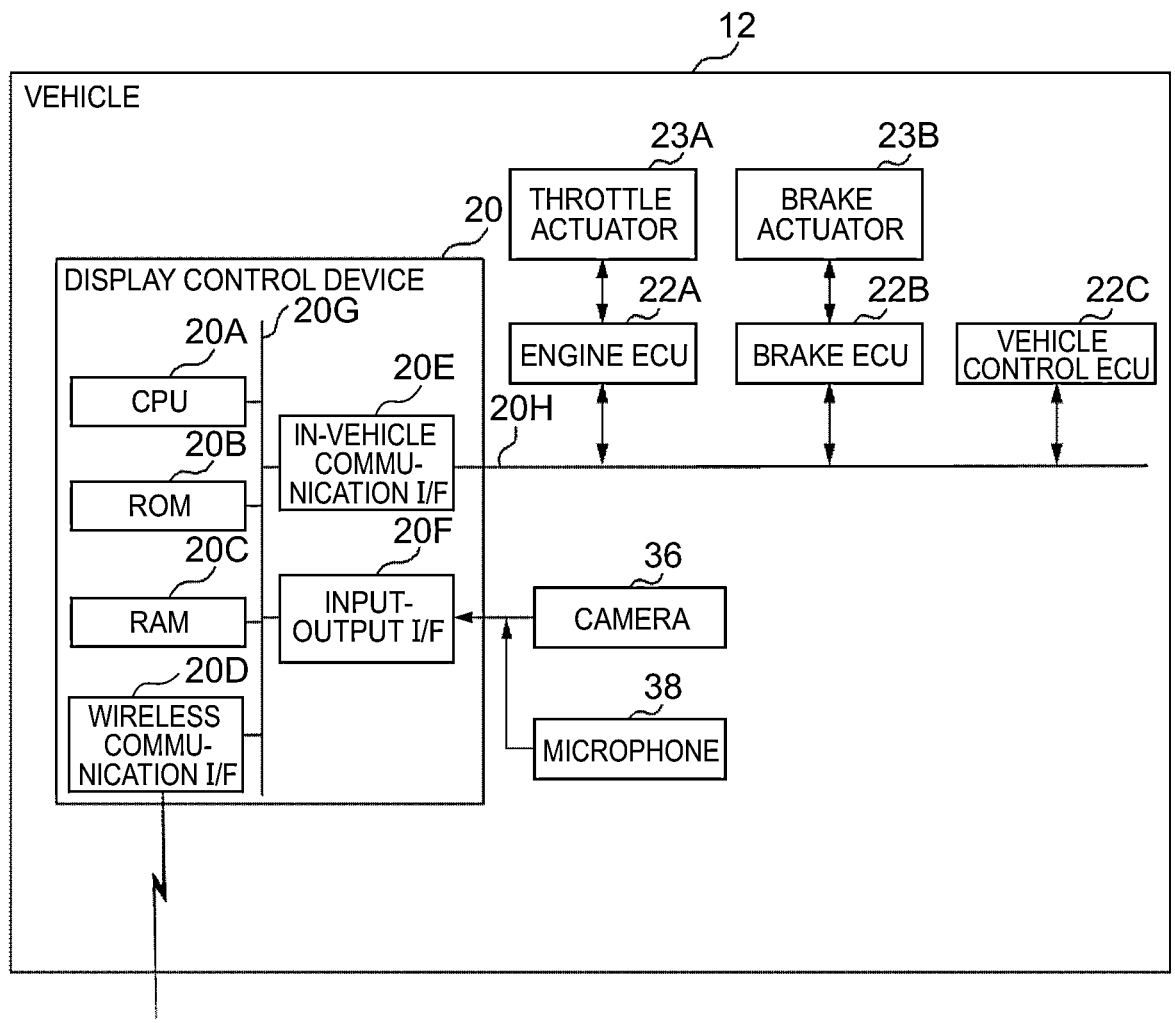
FIG. 2 is a block diagram showing a hardware configuration of a vehicle according to the embodiment.

As shown in FIG. 2, the vehicle 12 includes at least a display control device 20 and an electronic control unit (ECU). Further, the vehicle 12 is equipped with a camera 36 and a microphone 38.

The ECU includes an engine ECU 22A, a brake ECU 22B, and a vehicle control ECU 22C.

The engine ECU 22A is an ECU that controls an engine. A throttle actuator 23A as an on-board device is connected to the engine ECU 22A.

The brake ECU 22B is an ECU that controls a brake. A brake actuator 23B as an on-board device is connected to the brake ECU 22B.

The vehicle control ECU 22C is an ECU that comprehensively controls the vehicle 12, and realizes various controls in cooperation with other ECUs such as the engine ECU 22A and the brake ECU 22B.

The display control device 20 is configured to include a central processing unit (CPU) 20A, a read-only memory (ROM) 20B, a random access memory (RAM) 20C, a wireless communication interface (I/F) 20D, an in-vehicle communication I/F 20E, and an input-output I/F 20F. The CPU 20A, the ROM 20B, the RAM 20C, the wireless communication I/F 20D, the in-vehicle communication I/F 20E, and the input-output I/F 20F are connected to each other so as to be able to communicate with each other via an internal bus 20G.

The CPU 20A is a central arithmetic processing unit that executes various programs and controls each unit. That is, the CPU 20A reads the program from the ROM 20B, and executes the program using the RAM 20C as a work area.

Figure 3:
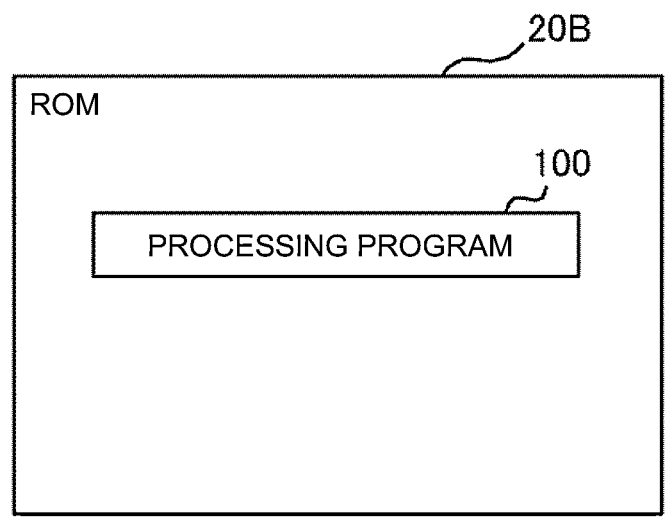
FIG. 3 is a block diagram showing a configuration of a read-only memory (ROM) in a display control device according to the embodiment.

The ROM 20B stores various programs and various data. As shown in FIG. 3, the ROM 20B according to the present embodiment stores a processing program 100. The processing program 100 may be stored in a storage such as a hard disk drive (HDD) or a solid state drive (SSD).

The processing program 100 as a display program is a program for performing a display control process that will be described later.

As shown in FIG. 2, the RAM 20C temporarily stores a program or data as a work area.

The wireless communication I/F 20D is an interface for connecting to the smart contact lens 14. For the wireless communication I/F 20D, a communication standard such as Bluetooth (registered trademark) or Wi-Fi (registered trademark) is used.

The in-vehicle communication I/F 20E is an interface for connecting to each ECU. For the interface, a communication standard based on a controller area network (CAN) protocol is used. The in-vehicle communication I/F 20E is connected to each ECU via an external bus 20H.

The input-output I/F 20F is an interface for communicating with the camera 36 and the microphone 38.

The camera 36 is provided in an upper portion of a front windshield or is adjacent to a rear-view mirror, and is an imaging device for capturing an image of a line of sight G of the occupant P of the vehicle 12 and an attraction target T that will be described later.

The microphone 38 is a device provided on an instrument panel, a center console, a front pillar, a dashboard, or the like, and collects sounds emitted by the occupant P of the vehicle 12.

Smart Contact Lens

Figure 4:
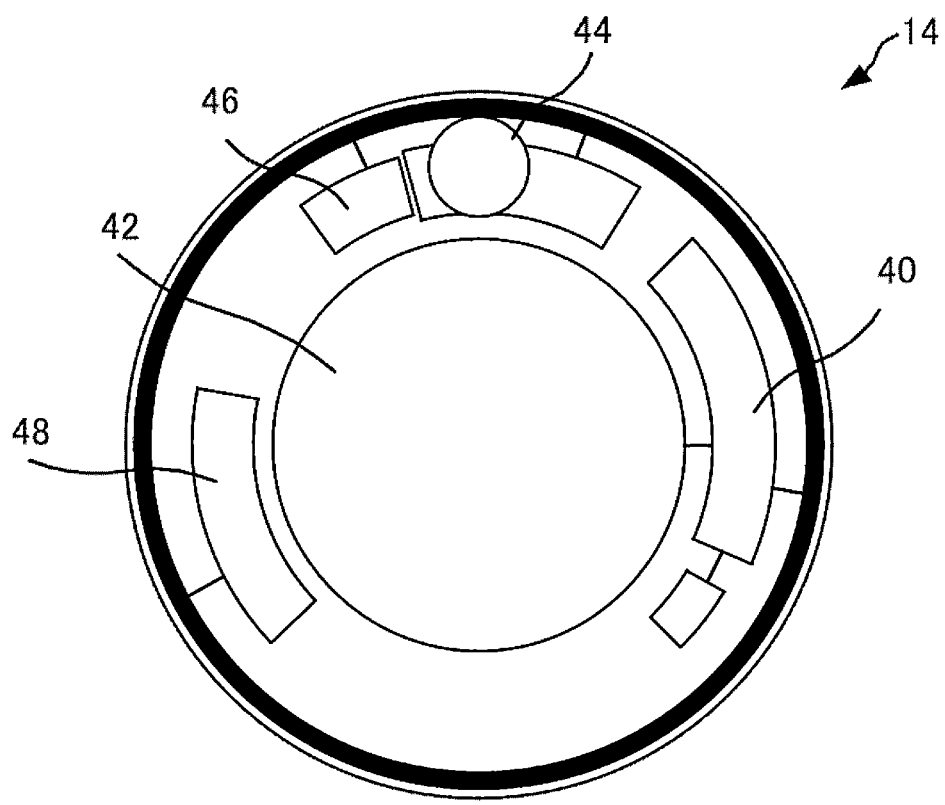
FIG. 4 is a diagram showing a hardware configuration of a smart contact lens according to the embodiment.

The smart contact lens 14 is a wearable device that is attached to the eyeball of the occupant P of the vehicle 12 and displays an image on the eyeball. As shown in FIG. 4, the smart contact lens 14 is configured to include a control unit 40, a display unit 42, a camera unit 44, a power supply unit 46, and a communication unit 48.

The control unit 40 controls each unit of the display unit 42, the camera unit 44, the power supply unit 46, and the communication unit 48 constituting the smart contact lens 14. The control unit 40 is configured as a microcomputer provided with a CPU, a ROM, and a RAM.

The display unit 42 functions as a display unit that displays a guidance display I that will be described later. The display unit 42 according to the present embodiment is a transmissive display, and includes at least a plurality of light emitting elements and a plurality of light receiving elements for detecting a line of sight. The light receiving elements receive light reflected by the surface of the eyeball of the occupant P.

The camera unit 44 functions as an imaging unit that captures images of the outside of the pupil. The camera unit 44 includes an imaging lens and a drive unit for driving the imaging lens.

The power supply unit 46 is a drive source for driving the control unit 40, the display unit 42, the camera unit 44, and the communication unit 48.

The communication unit 48 functions as a communication unit that communicates with the display control device 20. For example, a short-range wireless communication standard such as Bluetooth (registered trademark) is applied to the communication unit 48. The communication unit 48 receives the data of the guidance display I to be displayed on the display unit 42. The communication unit 48 according to the present embodiment is directly connected to the display control device 20. However, the present disclosure is not limited to this, and the communication unit 48 may be connected to the display control device 20 via a communication terminal such as a smartphone.

The smart contact lens 14 according to the present embodiment sets the position of the guidance display I to be displayed on the display unit 42 based on the captured image of the camera unit 44. With the above, in the smart contact lens 14, the content can be superimposed and displayed on the real image that is the display target of the guidance display I.

Figure 5:
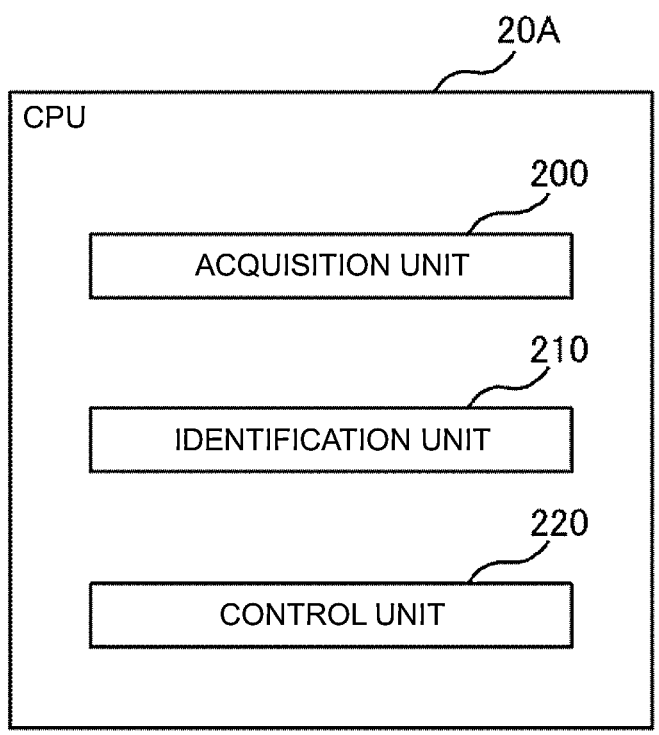
FIG. 5 is a block diagram showing a functional configuration of a central processing unit (CPU) in the display control device according to the embodiment.

As shown in FIG. 5, in the display control device 20 according to the present embodiment, the CPU 20A functions as an acquisition unit 200, an identification unit 210, and a control unit 220 by executing the processing program 100.

The acquisition unit 200 has a function of acquiring audio information related to utterance of the occupant P via the microphone 38. Further, the acquisition unit 200 has a function of acquiring the position of the line of sight G of the occupant P and the position of the attraction target T identified by the identification unit 210 to be described later via the camera 36.

The identification unit 210 has a function of identifying the attraction target T to which the line of sight G of the occupant P is guided. In the present embodiment, when the vehicle 12 is stopped, the identification unit 210 identifies the attraction target T based on the audio information related to the utterance of the occupant P acquired by the acquisition unit 200. Specifically, the identification unit 210 has a function of identifying the attraction target T by analyzing the intention of the utterance of the occupant P from the audio information. For example, when the acquisition unit 200 acquires the utterance "The engine start button cannot be found." while the vehicle 12 is stopped, the identification unit 210 acquires, as the intention of the utterance, that the occupant P is looking for the engine start button, and identifies the engine start button as the attraction target T.

The control unit 220 has a function of executing control to cause the display unit 42 included in the smart contact lens 14 to display the guidance display I for guiding the line of sight G of the occupant P to the attraction target T based on the positional relationship between the line of sight G of the occupant P and the attraction target T. In the present embodiment, the control unit 220 executes control to cause the display unit 42 to display the guidance display I in the direction within a visible range of the occupant P and in the same direction as the direction of the attraction target T with respect to the line of sight G of the occupant P. Note that, the visible range of the occupant P is the range of a horizontal viewing angle α that the occupant P can visually recognize with the direction of the line of sight G of the occupant P as the base axis. The viewing angle α is set to a predetermined value such as 30 degrees. Further, the control unit 220 repeats the control of displaying the guidance display I until the attraction target T is determined to be present within the visible range of the occupant P.

Figure 6:
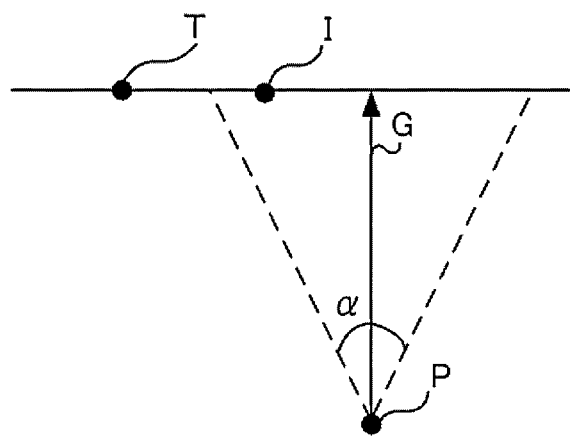
FIG. 6 is a schematic diagram for explaining a case where a guidance display according to the embodiment is displayed.

FIG. 6 shows a schematic diagram for explaining the display of the guidance display I according to the present embodiment. As shown in FIG. 6, the guidance display I is displayed within the range of the horizontal viewing angle α that the occupant P can visually recognize with the line of sight G of the occupant P as the base axis and in the same direction as the direction of the attraction target T with respect to the line of sight G of the occupant P. However, in the example shown in FIG. 6, the attraction target T is not within the range of the horizontal viewing angle α with respect to the line of sight G of the occupant P. Therefore, the occupant P may not be able to visually recognize the attraction target T.

Figure 7:
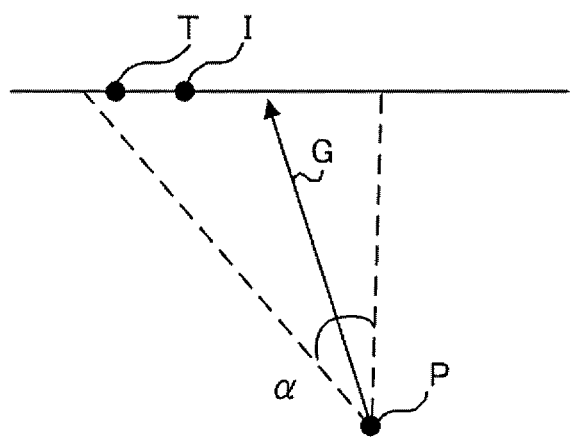
FIG. 7 is a schematic diagram for explaining a case where the guidance display according to the embodiment is displayed again.

FIG. 7 shows a schematic diagram for explaining the display of the guidance display I according to the present embodiment. After the control unit 220 displays the guidance display I at the position shown in FIG. 6, the acquisition unit 200 acquires the line of sight G of the occupant P again. Then, the control unit 220 controls to display the guidance display I based on the positional relationship between the line of sight G of the occupant P acquired again and the attraction target T. As shown in FIG. 7, the guidance display I is displayed within the range of the horizontal viewing angle α that the occupant P can visually recognize with the line of sight G of the occupant P acquired by the acquisition unit 200 again as the base axis, and in the same direction as the direction of the attraction target T with respect to the line of sight G of the occupant P. In the example shown in FIG. 7, the attraction target T is present within the range of the horizontal viewing angle α with the line of sight G of the occupant P as the base axis, the occupant P is determined to visually recognize the attraction target T.

Control Flow

The flow of processing executed in the display system 10 according to the present embodiment will be described with reference to the sequence diagram in FIG. 8. The processing in the display control device 20 is realized as the CPU 20A functions as the acquisition unit 200, the identification unit 210, and the control unit 220.

Figure 8:
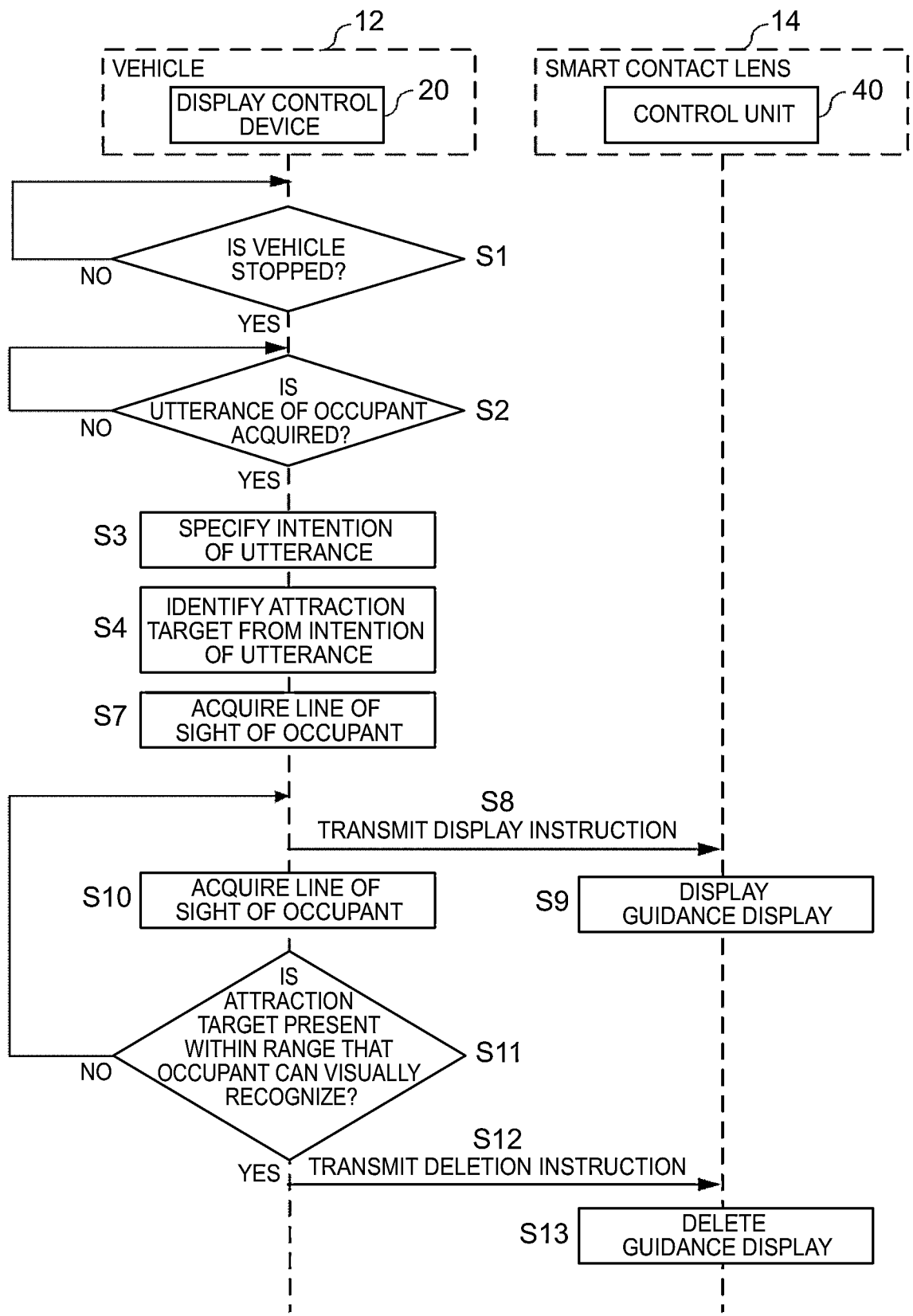
FIG. 8 is a sequence diagram showing a flow of processing in a display system according to a first embodiment.

In step S1 in FIG. 8, the display control device 20 stands by until the CPU 20A determines that the vehicle 12 is stopped. Specifically, the display control device 20 stands by until the CPU 20A acquires vehicle speed information from the vehicle control ECU 22C of the vehicle 12 and determines that the vehicle 12 is stopped using the vehicle speed information. When the CPU 20A determines that the vehicle 12 is stopped (step S1: YES), the CPU 20A proceeds to step S2.

In step S2, the display control device 20 stands by until the CPU 20A acquires the audio information related to the utterance of the occupant P via the microphone 38. When the CPU 20A acquires the audio information related to the utterance of the occupant P (step S2: YES), the process proceeds to step S3.

In the display control device 20, in step S3, the CPU 20A specifies the intention of the utterance of the occupant P.

In the display control device 20, in step S4, the CPU 20A identifies the attraction target T based on the intention of the utterance of the occupant P.

In the display control device 20, in step S7, the CPU 20A acquires the line of sight G of the occupant P via the camera 36.

In the display control device 20, In step S8, the CPU 20A transmits an instruction to cause the display unit 42 to display the guidance display I to the smart contact lens 14 via the wireless communication I/F 20D. Supplementally, the CPU 20A transmits the instruction to cause the display unit 42 to display the guidance display I within the range of the horizontal viewing angle α that the occupant P can visually recognize with the line of sight G of the occupant P as the base axis, and in the same direction as the direction of the attraction target T with respect to the line of sight G of the occupant P.

Figure 9:
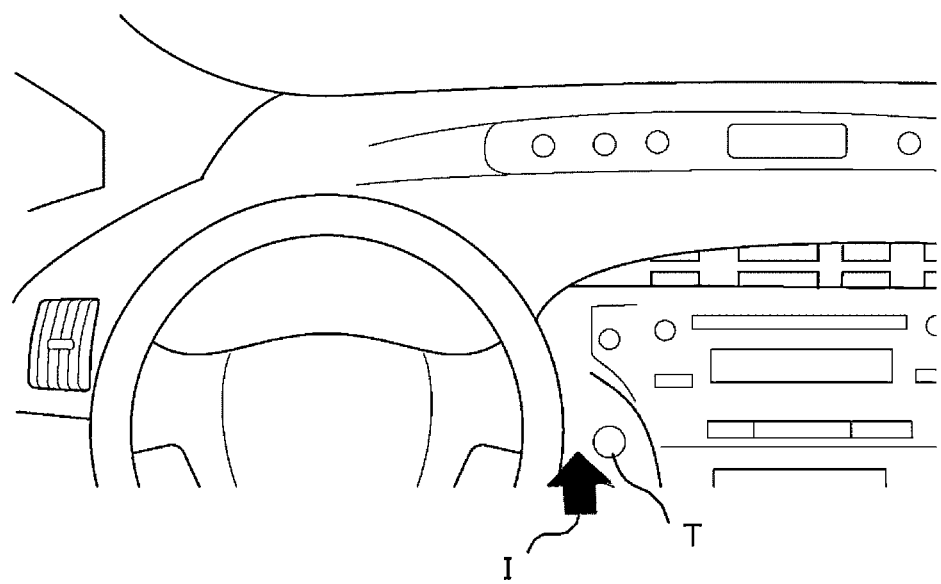
FIG. 9 is a schematic diagram for explaining a case where the guidance display is displayed when an attraction target according to the embodiment is present inside the vehicle.

On the other hand, in the smart contact lens 14, in step S9, the control unit 40 causes the display unit 42 to display the guidance display I. Specifically, in the smart contact lens 14, the position of the guidance display I is set based on the captured image of the camera unit 44. Then, the control unit 40 causes the display unit 42 to superimpose and display the guidance display I on the real image. For example, when the attraction target T is the engine start button, as shown in FIG. 9, the guidance display I for guiding the line of sight G of the occupant P to the engine start button as the attraction target T is displayed on the display unit 42.

In the display control device 20, in step S10, the CPU 20A acquires the line of sight G of the occupant P via the camera 36.

In the display control device 20, in step S11, the CPU 20A determines whether the attraction target T is present within the range of the horizontal viewing angle α that the occupant P can visually recognize with the direction of the line of sight G of the occupant P acquired by the CPU 20A in step S10 as the base axis. When the CPU 20A determines that the attraction target T is present within the range of the horizontal viewing angle α that the occupant P can visually recognize with the direction of the line of sight G of the occupant P as the base axis (step S11: YES), the process proceeds to step S12. On the other hand, when the CPU 20A determines that the attraction target T is not present within the range of the horizontal viewing angle α that the occupant P can visually recognize with the direction of the line of sight G of the occupant P as the base axis (step S11: NO), the process returns to step S8.

In the display control device 20, In step S12, the CPU 20A transmits an instruction to delete the guidance display I from the display unit 42 to the smart contact lens 14 via the wireless communication I/F 20D.

On the other hand, in the smart contact lens 14, in step S13, the control unit 40 deletes the guidance display I from the display unit 42.

Figure 10:
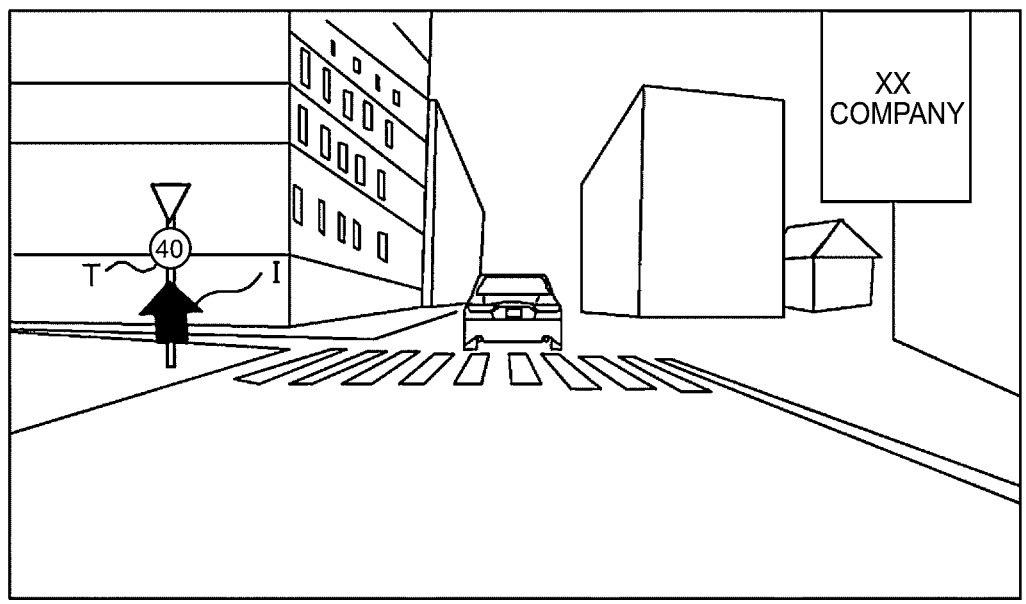
FIG. 10 is a schematic diagram for explaining a case where the guidance display is displayed when the attraction target according to the embodiment is present outside the vehicle.

In the present embodiment, a device that is provided inside the vehicle 12 and operated by the occupant P, such as a switch, is applied as the attraction target T. However, the present disclosure is not limited to this example. For example, a road sign or the like provided outside the vehicle 12 may be applied as the attraction target T. For example, when the acquisition unit 200 acquires the utterance "What is the speed limit here?" while the vehicle 12 is stopped, the identification unit 210 acquires, as the intention of the utterance, that the occupant P is looking for the speed limit sign, and identifies the speed limit sign as the attraction target T. In this case, as shown in FIG. 10, the guidance display I that guides the line of sight G of the occupant P to the speed limit sign as the attraction target T is displayed on the display unit 42.

Summary of First Embodiment

As described above, with the display system 10 according to the present embodiment, the line of sight G of the occupant P can be guided to the attraction target T without the need for a physical mechanism such as illumination.

Here, the identification unit 210 according to the present embodiment identifies the attraction target T based on the intention of the utterance of the occupant P. With the above, the line of sight G of the occupant P can be guided to the attraction target T without requiring a separate operation.

Further, the control unit 220 according to the present embodiment controls the guidance display I so as to display the guidance display I in the same direction as the direction of the attraction target T with respect to the line of sight G of the occupant P. With the above, the occupant P can find the attraction target T earlier than the case where the guidance display I is displayed in a direction different from the direction of the attraction target T with respect to the line of sight G of the occupant P.

Second Embodiment

In the first embodiment, the CPU 20A identifies the attraction target T based on the intention of the utterance of the occupant P. In a second embodiment, the CPU 20A identifies the attraction target T based on movement of the occupant P. Hereinafter, the differences from the first embodiment will be described. Since the hardware configuration is the same as that of the first embodiment, the description thereof is omitted.

The flow of processing in the display system 10 according to the present embodiment will be described with reference to FIG. 11. The steps for executing the same process as the flow of processing in the display system 10 shown in FIG. 8 are assigned the same step numbers as those in FIG. 8, and the description thereof will be omitted.

The flow of processing in the display system 10 shown in FIG. 11 has a difference from the flow of processing in the display system 10 shown in FIG. 8 in that processes in steps S5 and S6 are applied in place of the processes in steps S2 to S4.

In step S5 in FIG. 11, the display control device 20 stands by until the CPU 20A acquires image information related to movement of the occupant P via the camera 36. When the CPU 20A acquires the image information related to the movement of the occupant P (step S5: YES), the process proceeds to step S6.

In the display control device 20, in step S6, the CPA 20A identifies the attraction target T based on the image information related to the movement of the occupant P acquired by the CPU 20A in step S5. Specifically, the CPU 20A predicts the next movement of the occupant P by inputting the image information acquired in step S5 with respect to a learned model that has undergone machine learning using the next movement of the occupant P with respect to the acquired image information as teacher data and identifies the attraction target T. For example, when the CPU 20A acquires the image information related to the movement of the occupant P to fasten the seatbelt in step S5, the CPU 20A inputs the image information related to the movement of fastening the seatbelt, whereby any attraction target T (the engine start button, etc.) is identified.

Remarks

In the display system 10 according to each of the above embodiments, the form in which the display control device 20 is built in the vehicle 12 is applied. However, the display control device 20 may be installed outside the vehicle 12.

Further, in each of the embodiments above, a device that is provided inside the vehicle 12 and operated by the occupant P, such as a switch, is applied as the attraction target T. Therefore, in order to ensure safety, the CPU 20A executes the control to cause the display unit 42 to display the guidance display I when the vehicle 12 is stopped. However, the present disclosure is not limited to this example. For example, when a road sign or the like outside the vehicle 12 is applied as the attraction target T, the CPU 20A may execute control to cause the display unit 42 to display the guidance display I even while the vehicle 12 is driving.

Note that, various processors other than the CPU 20A may execute various processes executed by the CPU 20A in a manner such that the CPU 20A reads and executes the software (program) in each of the above embodiments. Examples of the processor in this case include a programmable logic device (PLD) of which circuit configuration can be changed after being manufactured, such as a field-programmable gate array (FPGA), and a dedicated electric circuit that is a processor including a circuit configuration that has been exclusively designed for executing a specific process, such as an application specific integrated circuit (ASIC). In addition, the above-mentioned processes may be executed by one of the various processors, or a combination of two or more processors of the same type or different types (for example, a plurality of FPGAs, and a combination of a CPU and an FPGA) may execute the processes above. Further, the hardware configuration of the various processors is, more specifically, an electric circuit in which circuit elements such as semiconductor devices are combined.

Further, in each of the above embodiments, the mode in which each program is stored (installed) in advance in a computer-readable non-transitory recording medium has been described. For example, the processing program 100 in the display control device 20 is stored in the ROM 20B in advance. However, the present disclosure is not limited to this, and each program may be provided in a form recorded in a non-transitory recording medium such as a compact disc read-only memory (CD-ROM), a digital versatile disc read-only memory (DVD-ROM), and a universal serial bus (USB) memory. Further, the program may be downloaded from an external device via a network.

The flow of processing described in each of the above embodiments is also an example, and unnecessary steps may be deleted, new steps may be added, or the processing order may be changed within a range that does not deviate from the gist.

What is claimed is:

1. A display control device comprising a processor, wherein the processor is configured to:
    identify an attraction target based on a determined intention of an utterance of a user;
    acquire the line of sight of the user in response to identifying the attraction target;
    cause a display unit attachable to an eyeball of the user to display a guidance display for guiding the line of sight of the user to the attraction target based on positional relationship between the line of sight of the user and the attraction target.

2. The display control device according to claim 1, wherein the processor identifies the attraction target based on movement of the user.

3. The display control device according to claim 1, wherein the processor causes the display unit to display the guidance display in the same direction as a direction of the attraction target with respect to the line of sight of the user.

4. A display system comprising:
    the display control device according to claim 1; and
    a lens device, wherein the lens device includes a communication unit that communicates with the display unit and the display control device.

5. A display method in which a computer executes processing comprising:
    identifying an attraction target based on a determined intention of an utterance of a user;
    acquiring the line of sight of the user in response to identifying the attraction target;
    causing a display unit attachable to an eyeball of the user to display a guidance display for guiding the line of sight of the user to the attraction target based on positional relationship between the line of sight of the user and the attraction target.

6. A non-transitory computer-readable medium storing a display program that causes a computer to execute processing comprising:
    identifying an attraction target based on a determined intention of an utterance of a user;
    acquiring the line of sight of the user in response to identifying the attraction target;
    causing a display unit attachable to an eyeball of the user to display a guidance display for guiding the line of sight of the user to the attraction target based on positional relationship between the line of sight of the user and the attraction target.

* * * * *